W. H. GREATOREX.
COCK.
APPLICATION FILED SEPT. 20, 1911.
1,021,518.  Patented Mar. 26, 1912.
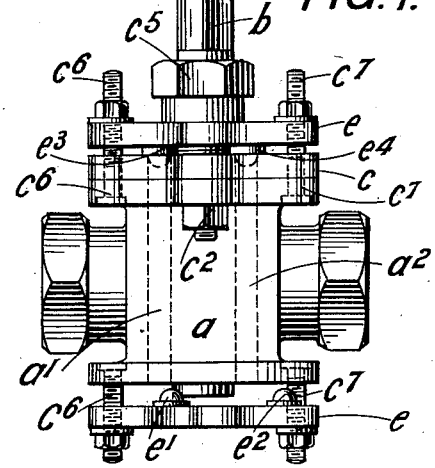
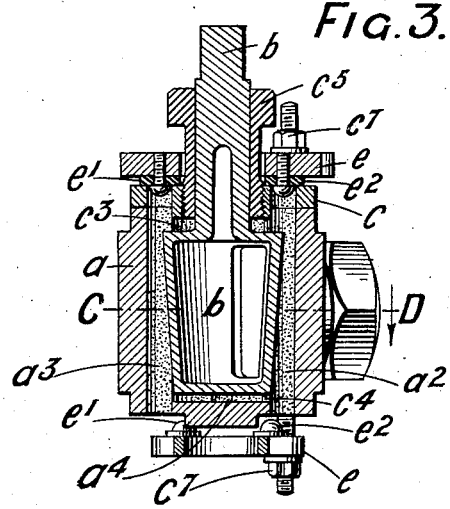
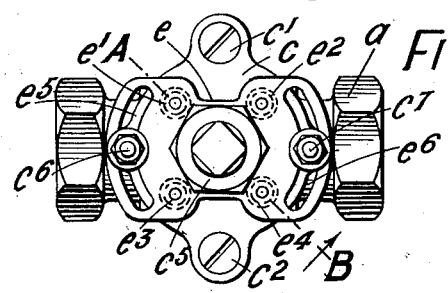
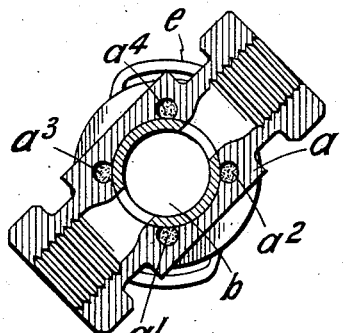
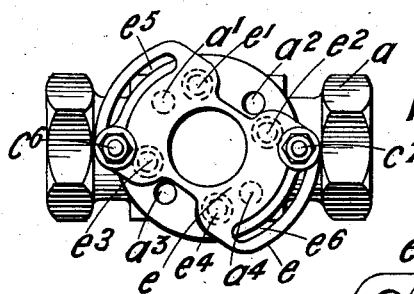
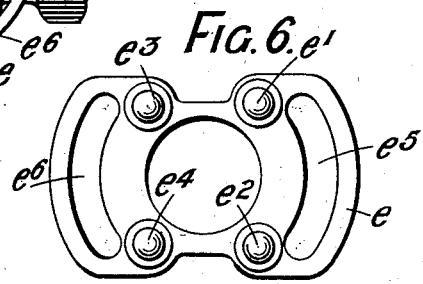
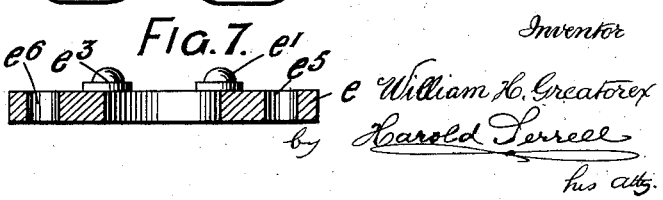

UNITED STATES PATENT OFFICE.

WILLIAM HENRY GREATOREX, OF CAMBERWELL, LONDON, ENGLAND, ASSIGNOR TO WALLACH BROTHERS LIMITED, OF LONDON, ENGLAND.

COCK.

1,021,518. Specification of Letters Patent. Patented Mar. 26, 1912.

Application filed September 20, 1911. Serial No. 650,439.

*To all whom it may concern:*

Be it known that I, WILLIAM HENRY GREATOREX, a subject of the King of Great Britain, residing at Camberwell, in the county of London, England, have invented certain new and useful Improvements in Cocks, and of which the following is a specification.

This invention relates to that type of cock in which packing grooves for containing packing are arranged parallel with the axis of the plug in such a manner that the packing rests between the exterior walls of the plug and the interior walls of the body of the cock. In cocks of this description, the packing in the grooves is liable to become cut or serrated with the consequent effect of preventing the plug from completely barring the passage of fluid through the cock and it is desirable that not only should the packing be accessible for the introduction of fresh packing into the packing grooves when wear has taken place to enable a leak to be taken up while the cock is under pressure, but also that this access can be accomplished without dismounting and separating the various parts of the cock from each other.

Now the object of this invention is to produce a cock of the type before stated in which, while the packing grooves are normally held securely sealed, yet the construction of the parts permits of adjustment so as to expose the ends of the grooves when desired for the purpose of replenishing the said grooves with packing, the adjustment of the said parts not requiring the disconnection of any of them and being so simple that it can be performed by the use of one hand, which is of vital importance in attending to the packing in cocks which are situated in positions not easily accessible.

In the drawing accompanying this specification an example of construction is shown in which the object above set out is secured.

Figure 1 is a side elevation, and Fig. 2 a plan of a cock with the parts in the normal position when in use. Fig. 3 is a vertical section taken on the line A—B of Fig. 2. Fig. 4 is an inverted plan of Fig. 1, showing two of the vertical packing grooves exposed for replenishing with packing. Fig. 5 is a sectional plan through the line C—D of Fig. 3, and Figs. 6 and 7 are detailed views.

$a$ is the body of a packed cock, $b$ a taper plug fitting the conical bore of the body $a$, $c$ is a packing gland secured to the body $a$ by bolts depending from a flange on the upper end of said body and nuts $c^1$, $c^2$. A turned annular projection on the gland $c$ projects into the packing chamber $c^3$ at the upper end of the plug, so that when forced down by screwing up the nuts $c^1$, $c^2$ the packing in the chamber $c^3$ is pressed snugly around the upper end of the plug $b$, while the lower end of the said plug rides on the packing in the chamber $c^4$. The bore of the gland $c$ through which the shank of the plug $b$ passes, is enlarged and screw threaded, to engage an externally screw threaded gland socket $c^5$, the said socket being bored to fit the shank of the plug $b$ which passes through it and in which socket said shank rotates. The purpose of the gland socket $c^5$ is to allow the chamber $c^3$ to be replenished with packing without removing the gland $c$, as the gland $c^5$ can be withdrawn for that purpose while the cock is under pressure.

The vertical packing grooves $a^1$, $a^2$, $a^3$, $a^4$ extend through the cock body $a$ and register with apertures extending through the gland $c$ when the parts are assembled which thereby form the upper ends of said grooves. Thus the grooves may be exposed at their upper and lower ends, see Fig. 3, to give access thereto for their replenishing with packing. The chamber $c^4$ below the plug $b$ will in the process of replenishing the vertical packing grooves also be replenished with packing, as said chamber $c^4$ communicates with the vertical packing grooves. In order to enable the opposite ends of the packing grooves to be securely sealed, a plate $e$ is provided at each end of the body $a$, which plate has four projections $e^1$, $e^2$, $e^3$, $e^4$, so located thereon that when the plate is in position on the cock they shall coincide with and close the ends of the vertical packing grooves $a^1$, $a^2$, $a^3$, $a^4$. The said projections may be of metal, or of hard rubber or such like material, having flat surfaces, to bed on the flat surfaces around the opening of the ends of the vertical packing grooves.

The projections $e^1$, $e^2$, $e^3$, and $e^4$ are preferably formed separate from the plate $e$ and connected thereto by means of pins or studs, the heads of which are adapted to enter the ends of the said grooves when said plate is adjusted to the position on the body $a$ to close the ends of the grooves.

The upper plate is formed with a central aperture through which passes the gland socket $c^5$ around which the plate can be turned, while a similar aperture is formed in the lower plate adapted to receive a central projection on the lower end of the cock body $a$. Two studs $c^6$, $c^7$, on each end of the body $a$, each provided with a nut on the screw threaded upper end thereof, are attached to and project from the body $a$. These studs are arranged equidistant from the axis of the plug $b$ and pass through segmental slots $e^5$, $e^6$ formed in the plates $e\ e$, so that the said plates $e\ e$ may be adjusted about the axis of the plug $b$ to expose the ends of the packing grooves or to seal them as required. The nuts on the studs $c^6$, $c^7$, when screwed toward the body $a$ bear on the plate $e$, and press the flat surfaces of the projections $e^1$, $e^2$, $e^3$, $e^4$ closely on the flat surfaces around the openings of the vertical packing grooves $a^1$, $a^2$, $a^3$, $a^4$, to securely seal up the said openings against leakage from the cock.

To replenish the vertical grooves $a^1$—$a^4$ with packing, the passage for fluid through the cock must be closed by the plug $b$, the nuts on the studs $c^6$, $c^7$ at one or both ends of the body $a$ are then screwed outwardly to enable the plate or plates $e$ to be moved in an axial direction, and the projections on said plates to be disengaged from the ends of the vertical packing grooves. The plate $e$ can then be partially rotated, its movement being guided by the studs $c^6$, $c^7$, and the extent of its travel being determined by the length of the slots $e^5$, $e^6$. Each plate is formed with side recesses, which when the said plate has been turned to the extent of its movement in one direction or the other, expose the ends of two of the packing grooves. Fig. 4 shows the ends of the grooves $a^2$, $a^3$ thus exposed. When the operator has replenished the said grooves with packing which can be done by one hand placing extra packing in the end of the groove and driving it home with a hammer and a drift, the plate $e$ is rotated in the opposite direction, so, exposing the vertical packing grooves $a^1$—$a^4$, for attention. The plate $e$ is then returned to its original position for sealing the grooves, as hereinbefore explained, and the passage through the cock can be again opened.

What I claim as my invention and desire to secure by Letters Patent is:—

1. In a cock; the combination with a body or casing, a hollow plug within said body, said body having vertical grooves extending therein to receive packing to pack said plug; of a plate capable of being partially rotated about the axis of said plug, projections on said plate to contact with said body to seal the ends of said grooves, means for connecting said plate to said body, means for guiding said plate in its rotary movements, and means to allow of the movement of said plate to expose the ends of said grooves.

2. In a cock; the combination with a body or casing, a hollow plug within said body, said body having vertical grooves extending therein to receive packing to pack said plug; of a plate capable of being rotated about the axis of said plug, said plate having side recesses therein, projections on said plate to seal the ends of said grooves, means for connecting said plate to said body, means for guiding said plate in its rotary movements, and means to allow of the movement of said plate to allow said recesses to come opposite the ends of said grooves to expose the latter.

3. In a cock; the combination with a body or casing, a hollow tapered plug within said body, said body having vertical grooves extending therein to receive packing to pack said plug; of a plate capable of being turned about the axis of said plug, projections on said plate to contact with said body to seal the ends of said grooves, means for connecting said plate to said body, means for forcing said plate toward said body to cause said projections to contact with the said body, and means to allow of the movement of said plate to expose the ends of said grooves.

4. In a cock; the combination with a body or casing, a hollow tapered plug within said body, said body having vertical grooves extending therein to receive packing to pack said plug; of a plate, projections carried by said plate to contact with said body at the ends of said grooves, pins or studs to connect said projections to said plate the heads of said pins or studs being adapted to enter the ends of said grooves, means for connecting said plate to said body, and means to allow of the adjustment of said plate on said body to expose the ends of said grooves.

5. In a cock; the combination with a body or casing, a hollow tapered plug within said body, said body having vertical grooves extending therein to receive packing to pack said plug; of a packing gland at the upper end of said body, said gland having a central screw threaded aperture therein, means for attaching said gland to said body, a gland socket surrounding the shank of said plug and adapted to be screwed into and out of said screw threaded aperture in said packing gland, a plate surrounding said socket, projections on said plate to seal the ends of said grooves, means for connecting said plate to said body, and means to allow of the adjustment of said plate on said body to expose the ends of said grooves.

6. In a cock; the combination with a body or casing, a hollow tapered plug within said body, said body having vertical grooves extending therein to receive packing to pack said plug; of a plate adapted to be rotated upon said body, projections on said plate adapted to contact with said body to seal the ends of said grooves, said plate having formed therein segmental slots, studs projecting from said body for engaging said slots and adapted to contact with the ends of said slots to limit the rotary movement of the plate, and nuts on said studs adapted to engage said plate to force the latter toward said body and cause the projections to seal said grooves.

7. In a cock; the combination with a body or casing, a hollow tapered plug within said body, said body having vertical grooves extending therethrough to receive packing to pack said plug; of a plate at the upper and lower ends of said body, projections on said plates adapted to seal the opposite ends of said grooves, means for connecting said plates to said body, and means to allow of the rotary movement of said plates on said body to expose the ends of said grooves.

In witness whereof I have hereunto set my hand in the presence of two witnesses.

WILLIAM HENRY GREATOREX.

Witnesses:
  GRIFFITH BREWER,
  WILLIAM A. MARSHALL.

---

Copies of this patent may be obtained for five cents each, by addressing the "Commissioner of Patents, Washington, D. C."